(12) United States Patent
Vedantham et al.

(10) Patent No.: US 10,574,295 B2
(45) Date of Patent: Feb. 25, 2020

(54) BEACON SLOT ALLOCATION IN PRIME

(71) Applicant: Texas Instruments Incorporated, Dallas, TX (US)

(72) Inventors: Ramanuja Vedantham, Allen, TX (US); Kumaran Vijayasankar, Dallas, TX (US); Ramachandran Ananthakrishnan, Richardson, TX (US); Susan Yim, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/898,923

(22) Filed: Feb. 19, 2018

(65) Prior Publication Data
US 2018/0241432 A1    Aug. 23, 2018

Related U.S. Application Data

(63) Continuation of application No. 13/651,338, filed on Oct. 12, 2012, now abandoned.

(60) Provisional application No. 61/547,396, filed on Oct. 14, 2011.

(51) Int. Cl.
*H04B 3/54* (2006.01)

(52) U.S. Cl.
CPC ..... *H04B 3/542* (2013.01); *H04B 2203/5408* (2013.01); *H04B 2203/5416* (2013.01); *H04B 2203/5433* (2013.01)

(58) Field of Classification Search
USPC ........................................................ 370/329
See application file for complete search history.

(56) References Cited

U.S. PATENT DOCUMENTS

| | | |
|---|---|---|
| 4,166,275 A | 8/1979 | Michaels et al. |
| 7,366,126 B2 | 4/2008 | Xu |
| 7,432,892 B2 | 10/2008 | Lee et al. |
| 7,450,553 B2 | 11/2008 | Park et al. |
| 7,657,703 B1 | 2/2010 | Singh |

(Continued)

OTHER PUBLICATIONS

Draft Specification for PoweRline Intelligent Metering Evolution, PRIME Alliance, R.1.3.6.

(Continued)

*Primary Examiner* — Peter G Solinsky
(74) *Attorney, Agent, or Firm* — Brian D. Graham; Charles A. Brill; Frank D. Cimino (57) ABSTRACT

Systems and methods for efficiently allocating beacon slot among multiple nodes on multiple levels within a power line communication network are described. In various implementations, these systems and methods may be applicable to Power Line Communications (PLC). For example, a method may include performing, by a communications device, assigning beacon transmission times to nodes within the communication device's network. The assigned beacon transmission times comprise a beacon slot and frame pattern. The beacon slot and frame pattern ensure that each node does not transmit a beacon in a beacon slot that is adjacent to a beacon slot assigned to a parent or child node. A beacon transmission slot is reserved for a base node in every frame. The frames may be organized into thirty-two-frame superframes, wherein each frame comprises a base node beacon slot and four switch node beacon slots.

19 Claims, 6 Drawing Sheets

| NODE | LEVEL | SLOT | FRAME |
|---|---|---|---|
| 801 | 0 | 0 | ALL |
| 802 | 1 | 3 | 1 |
| 803 | 1 | 3 | 2 |
| 804 | 2 | 1 | 2 |
| 805 | 2 | 1 | 3 |
| 806 | 2 | 1 | 3 |
| 808 | 3 | 3 | 3 |
| 807 | 2 | 1 | 4 |
| 809 | 3 | 3 | 4 |
| 810 | 3 | 3 | 4 |
| 811 | 3 | 3 | 4 |
| 812 | 3 | 3 | 5 |
| 813 | 3 | 3 | 5 |

(56) References Cited

U.S. PATENT DOCUMENTS

| | | | |
|---|---|---|---|
| 7,706,404 B2* | 4/2010 | Fleming | H04W 52/0232 370/468 |
| 7,903,653 B2* | 3/2011 | Lee | H04L 12/189 370/390 |
| 8,099,074 B2 | 1/2012 | Ebner et al. | |
| 8,432,887 B1 | 4/2013 | Ding | |
| 8,432,892 B2* | 4/2013 | van Erven | H04W 56/001 370/345 |
| 8,447,241 B2* | 5/2013 | Suwa | H04B 1/005 455/188.1 |
| 8,498,242 B2 | 7/2013 | Luo et al. | |
| 8,594,509 B2 | 11/2013 | Shin et al. | |
| 8,718,115 B2 | 5/2014 | Dabak et al. | |
| 8,743,908 B2 | 6/2014 | Varadarajan et al. | |
| 2004/0227621 A1 | 11/2004 | Cope et al. | |
| 2007/0086425 A1 | 4/2007 | Leow et al. | |
| 2009/0030926 A1 | 1/2009 | Aharoni et al. | |
| 2010/0111006 A1 | 5/2010 | Zhai et al. | |
| 2010/0203832 A1 | 8/2010 | Russell et al. | |
| 2011/0038358 A1 | 2/2011 | Wang et al. | |
| 2011/0043340 A1 | 2/2011 | Kim et al. | |
| 2011/0223952 A1 | 9/2011 | Nanda et al. | |
| 2011/0255557 A1 | 10/2011 | Varadarajan et al. | |
| 2012/0057506 A1 | 3/2012 | Kumar | |
| 2012/0115488 A1* | 5/2012 | Jiang | H04W 52/325 455/438 |
| 2012/0250664 A1* | 10/2012 | Li | H04W 74/085 370/338 |
| 2012/0310395 A1 | 12/2012 | El-Hoiydi | |
| 2013/0027219 A1 | 1/2013 | Myoung et al. | |
| 2013/0051446 A1 | 2/2013 | Vijayasankar et al. | |
| 2013/0089049 A1 | 4/2013 | Jeon et al. | |
| 2013/0253701 A1 | 9/2013 | Halloran et al. | |
| 2014/0105313 A1 | 4/2014 | Kim et al. | |

OTHER PUBLICATIONS

Draft Specification for PoweRline Intelligent Metering Evolution, PRIME Alliance, R.1.3.E.

* cited by examiner

| NODE | SLOT | FRAME |
|---|---|---|
| BASE NODE | 0 | ALL |
| 1 | 2 | 1 |
| 2 | 4 | |
| 3 | 2 | 2 |
| 4 | 4 | |
| 5 | 2 | 3 |
| 6 | 4 | |
| 7 | 2 | 4 |
| 8 | 4 | |
| 9 | 2 | 5 |
| 10 | 4 | |
| 11 | 2 | 6 |
| 12 | 4 | |
| 13 | 2 | 7 |
| 14 | 4 | |
| 15 | 2 | 8 |
| 16 | 4 | |
| 17 | 2 | 9 |
| 18 | 4 | |
| 19 | 2 | 10 |
| 20 | 4 | |
| 21 | 2 | 11 |
| 22 | 4 | |
| 23 | 2 | 12 |
| 24 | 4 | |
| 25 | 2 | 13 |
| 26 | 4 | |
| 27 | 2 | 14 |
| 28 | 4 | |
| 29 | 2 | 15 |
| 30 | 4 | |
| 31 | 2 | 16 |
| 32 | 4 | |
| 1 | 2 | 17 |
| ⋮ | ⋮ | ⋮ |
| 32 | 4 | 32 |

| NODE | LEVEL | SLOT | FRAME |
|---|---|---|---|
| 801 | 0 | 0 | ALL |
| 802 | 1 | 3 | 1 |
| 803 | 1 | 3 | 2 |
| 804 | 2 | 1 | 2 |
| 805 | 2 | 1 | 3 |
| 806 | 2 | 1 | 3 |
| 808 | 3 | 3 | 3 |
| 807 | 2 | 1 | 4 |
| 809 | 3 | 3 | 4 |
| 810 | 3 | 3 | 4 |
| 811 | 3 | 3 | 4 |
| 812 | 3 | 3 | 5 |
| 813 | 3 | 3 | 5 |

FIG. 10

| SWITCH NODE | PARENT NODE | LEVEL | SLOT | SEQUENCE |
|---|---|---|---|---|
| 1 | 0 | 1 | 2 | 0 - 16 |
| 2 | 0 | 1 | 2 | 1 - 17 |
| 3 | 2 | 2 | 2 | 2 - 18 |
| ⋮ | ⋮ | ⋮ | ⋮ | ⋮ |
| 11 | 2 | 2 | 2 | 10 - 26 |
| ⋮ | ⋮ | ⋮ | ⋮ | ⋮ |
| 16 | 11 | 3 | 2 | 15 - 31 |
| 17 | 0 | 1 | 4 | 0 - 16 |
| ⋮ | ⋮ | ⋮ | ⋮ | ⋮ |
| 32 | 16 | 4 | 4 | 15 - 31 |
| 33 | 1 | 2 | 1 | 1 - 17 |
| 34 | 0 | 1 | 3 | 0 - 16 |
| 35 | 34 | 2 | 1 | 1 - 17 |
| ⋮ | ⋮ | ⋮ | ⋮ | ⋮ |

BEACON SLOT ALLOCATION IN PRIME

CROSS-REFERENCE TO RELATED APPLICATIONS

This application is a continuation of and claims priority to U.S. patent application Ser. No. 13/651,338 filed on Oct. 12, 2012, which claims the benefit of the filing date of U.S. Provisional Patent Application No. 61/547,396, which is titled "Beacon Slot Allocation in PRIME" and was filed on Oct. 14, 2011, the disclosures of which are hereby incorporated by reference herein in their entirety.

BACKGROUND

There are several different types of communication networks available today. For example, power line communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

For each different type of communications network, different standardizing efforts are commonly undertaken throughout the world. For instance, in the case of PLC communications may be implemented differently depending upon local regulations, characteristics of local power grids, etc. An example PLC standardization effort includes, for example, the Powerline-Related Intelligent Metering Evolution (PRIME) standard designed for OFDM-based (Orthogonal Frequency-Division Multiplexing) communications. The PRIME standard requires the base node as well as switch nodes to transmit beacons periodically. While the standard requires beacon transmission, the beacon slot allocation algorithm is left to the service provider's implementation.

SUMMARY

Systems and methods to efficiently allocate beacon slot among multiple nodes on multiple levels within a power line communication network are described. In an illustrative embodiment, a method may include performing, by a communications device, assigning beacon transmission times to nodes within the communication device's network. The assigned beacon transmission times comprise a beacon slot and frame pattern. The beacon slot and frame pattern ensure that each node does not transmit a beacon in a beacon slot that is adjacent to a beacon slot assigned to a parent or child node.

A beacon transmission slot is reserved for a base node in every frame. The frames may be organized into thirty-two-frame superframes, wherein each frame comprises a base node beacon slot and four switch node beacon slots.

If there are no more than thirty-two switch nodes in the network, then every other slot in each frame is assigned to a different node until all nodes have a designated beacon transmission time. In one embodiment, a second beacon slot and fourth beacon slot in each frame is assigned to a different node until all nodes have a designated beacon transmission slot and pattern. A first beacon slot and a third beacon slot in each frame are reserved as unassigned.

If there are no more than sixty-four switch nodes in the network, then a third beacon slot in each frame is assigned to a different node on a first level below the base node. A first beacon slot, a second beacon slot, and a fourth beacon slot in each frame are reserved as unassigned. A first switch node beacon slot and a third switch node beacon slot in each frame may be assigned to a different node on a second level below the base node. When a parent node on the first level has a child node on the second level, and when both the parent node and the child node are assigned to the same beacon slot, then different frame patterns may be used to avoid beacon transmission conflicts. A first frame pattern is assigned to the parent node, and a second frame pattern is assigned to the child node, wherein the second frame pattern prevents the child node from transmitting a beacon in the same frame as the parent node.

If there are more than sixty-four switch nodes in the network then the beacon slot and frame patterns may be reused and assigned beacon to another node that is at least n-levels away, such as two levels away. Alternatively, or additionally, the beacon slot and frame pattern assigned to a first node may also be assigned to a second node that is on the same level below the base node as the first node, if the first node and the second node do not share a same parent node.

The solution described herein preserves the parent-child switch node relationship by not allocating the same slot and pattern for beacon transmissions. It also allows for sufficient turnaround time between reception and transmission of beacon at a switch node, and thereby mitigates interference from other beacon transmissions.

BRIEF DESCRIPTION OF THE DRAWINGS

Having thus described the invention(s) in general terms, reference will now be made to the accompanying drawings, wherein:

DETAILED DESCRIPTION

The inventions now will be described more fully hereinafter with reference to the accompanying drawings. The inventions may, however, be embodied in many different forms and should not be construed as limited to the embodiments set forth herein. Rather, these embodiments are provided so that this disclosure will be thorough and complete, and will fully convey the scope of the inventions to a person of ordinary skill in the art. A person of ordinary skill in the art may be able to use the various embodiments of the inventions.

In various embodiments, the systems and methods described herein may be applicable to a wide variety of communication environments, including, but not limited to, those involving Power Line Communications (PLC), wireless communications (e.g., cellular, Wi-Fi, WiMax, etc.), wired communications (e.g., Ethernet, etc.), or the like. For ease of explanation, several examples discussed below are described specifically in the context of PLC. As a person of ordinary skill in the art will recognize in light of this disclosure, however, certain techniques and principles disclosed herein may also be used in other communication environments.

Figure 1:
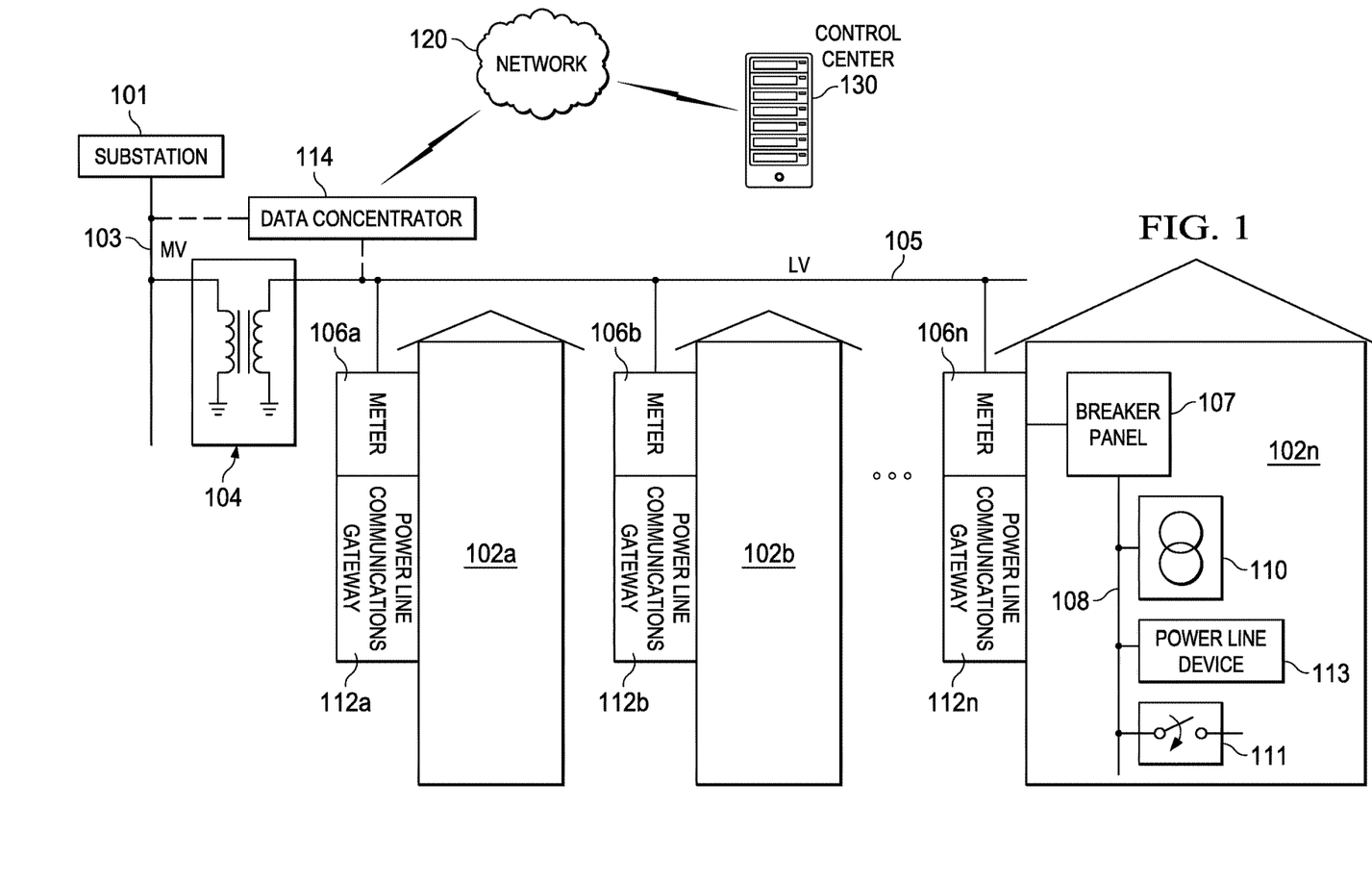
FIG. 1 is a diagram of a PLC system according to some embodiments.

FIG. 1 depicts an electric power distribution system according to some example embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. Although referred to as "residences," premises 102a-n may include any type of building, facility or location where electric power is received and/or consumed. A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use, for example, a carrier signal having a frequency different from that of the power signal. The carrier signal may be modulated by the data, for example, using an orthogonal frequency division multiplexing (OFDM) scheme or the like.

PLC modems or gateways 112a-n at residences 102a-n use the MV/LV power grid to carry data signals to and from a base node, such as PLC data concentrator 114, without requiring additional wiring. Data concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more data concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

In some embodiments, each concentrator 114 may be seen as a base node for a PLC domain, each such domain comprising downstream PLC devices that communicate with control center 130 through a respective concentrator 114. For example, in FIG. 1, device 106a-n, 112a-n, and 113 may all be considered part of the PLC domain that has data concentrator 114 as its base node; although in other scenarios other devices may be used as the base node of a PLC domain. In a typical situation, multiple nodes may be deployed in a given PLC network, and at least a subset of those nodes may be tied to a common clock through a backbone (e.g., Ethernet, digital subscriber loop (DSL), etc.). Further, each PLC domain may be coupled to MV line 103 through its own distinct transformer similar to transformer 104.

Still referring to FIG. 1, meter 106, gateways 112, PLC device 113, and data concentrator 114 may each be coupled to or otherwise include a PLC modem or the like. The PLC modem may include transmitter and/or receiver circuitry to facilitate the device's connection to power lines 103, 105, and/or 108.

Figure 2:
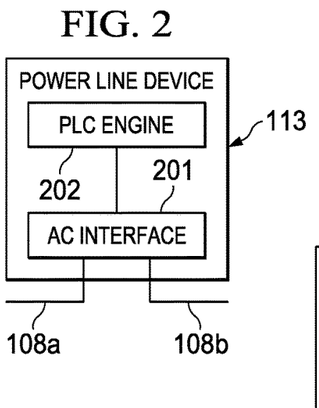
FIG. 2 is a block diagram of a PLC device or modem according to some embodiments.

FIG. 2 is a block diagram of PLC device or modem 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. As noted above, in some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular channel or frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data concentrators 114, etc.) for further processing. Conversely, PLC engine 202 may receive instructions and/or other information from such higher-level PLC devices encoded in PLC signals, for example, to allow PLC engine 202 to select a particular frequency band in which to operate.

Figure 3:
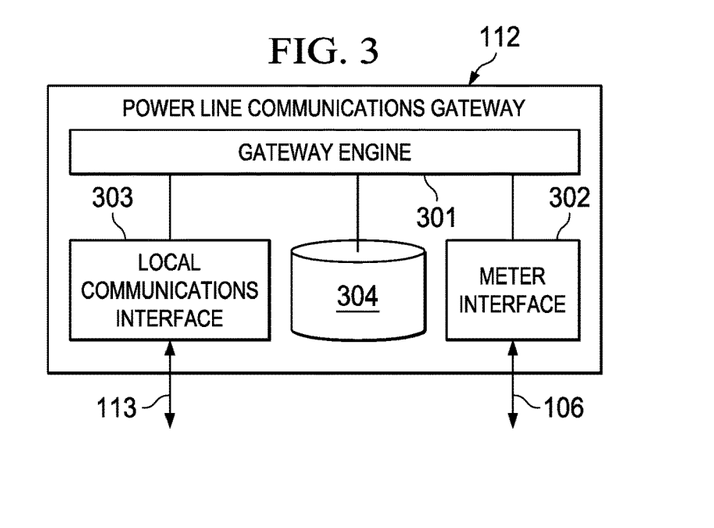
FIG. 3 is a block diagram of a PLC gateway according to some embodiments.

FIG. 3 is a block diagram of PLC gateway 112 according to some embodiments. As illustrated in this example, gateway engine 301 is coupled to meter interface 302, local communication interface 303, and frequency band usage database 304. Meter interface 302 is coupled to meter 106, and local communication interface 304 is coupled to one or more of a variety of PLC devices such as, for example, PLC device 113. Local communication interface 304 may provide a variety of communication protocols such as, for example, ZIGBEE, BLUETOOTH, WI-FI, WI-MAX, ETHERNET, etc., which may enable gateway 112 to communicate with a wide variety of different devices and appliances. In operation, gateway engine 301 may be configured to collect communications from PLC device 113 and/or other devices, as well as meter 106, and serve as an interface between these various devices and PLC data concentrator 114. Gateway engine 301 may also be configured to allocate frequency bands to specific devices and/or to provide information to such devices that enable them to self-assign their own operating frequencies.

In some embodiments, PLC gateway 112 may be disposed within or near premises 102n and serve as a gateway to all PLC communications to and/or from premises 102n. In other embodiments, however, PLC gateway 112 may be absent and PLC devices 113 (as well as meter 106n and/or other appliances) may communicate directly with PLC data concentrator 114. When PLC gateway 112 is present, it may include database 304 with records of frequency bands currently used, for example, by various PLC devices 113 within premises 102n. An example of such a record may include, for instance, device identification information (e.g., serial number, device ID, etc.), application profile, device class, and/or currently allocated frequency band. As such, gateway engine 301 may use database 304 in assigning, allocating, or otherwise managing frequency bands assigned to its various PLC devices.

Figure 4:
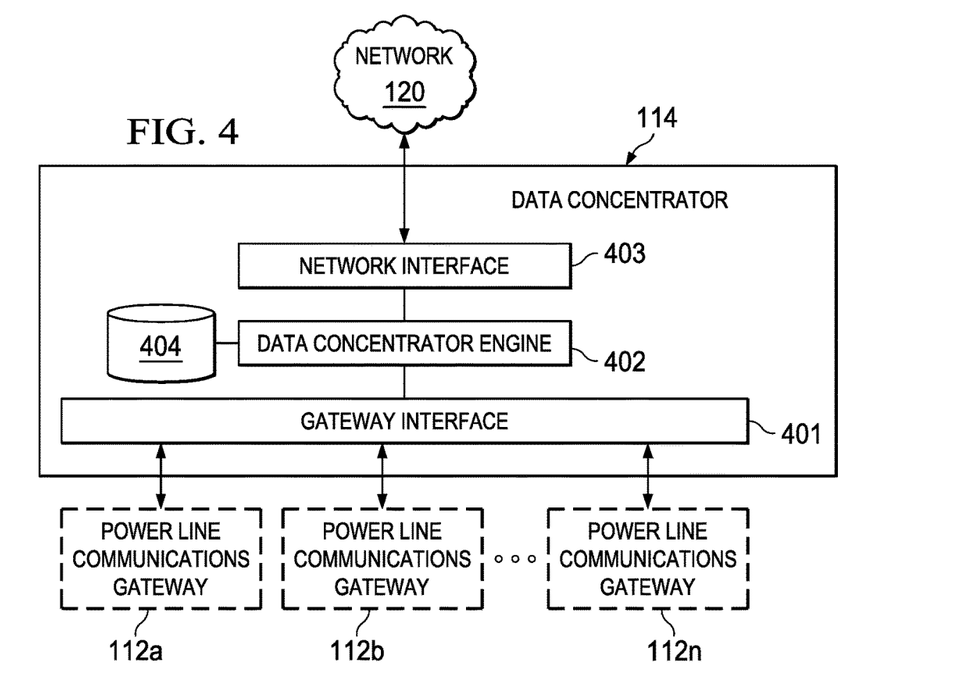
FIG. 4 is a block diagram of a PLC data concentrator according to some embodiments.

FIG. 4 is a block diagram of a PLC data concentrator according to some embodiments. Gateway interface 401 is coupled to data concentrator engine 402 and may be configured to communicate with one or more PLC gateways 112a-n. Network interface 403 is also coupled to data concentrator engine 402 and may be configured to communicate with network 120. In operation, data concentrator engine 402 may be used to collect information and data from multiple gateways 112a-n before forwarding the data to control center 130. In cases where PLC gateways 112a-n are absent, gateway interface 401 may be replaced with a meter and/or device interface (now shown) configured to communicate directly with meters 116a-n, PLC devices 113, and/or other appliances. Further, if PLC gateways 112a-n are absent, frequency usage database 404 may be configured to store records similar to those described above with respect to database 304.

Network elements that communicate using the PRIME standard may be arranged in subnetworks. A subnetwork has a single base node and one or more services nodes that branch from the base node in one or more levels. The base node acts as a master node and provides the subnetwork with connectivity. The base node manages the subnetwork resources and connections. The base node is initially the only node in the subnetwork and other nodes follow a registration process to enroll on the subnetwork.

Service nodes may operate in one of three functional states: disconnected, terminal, or switch. Service nodes start in a disconnected state during which the node is not capable of communicating or switching the traffic of another node. In the disconnected state, a service node searches for an operational network and attempts to register on the network. In the terminal state, a service node is capable of communicating its traffic, but it is not capable of switching traffic for any other node. In the switch state, a service node is capable of performing all terminal functions and is capable of forwarding data to and from other devices on the subnetwork.

Each service node has a level in the subnetwork topology. The nodes that are connected directly to the base node have level 1. The level of any service node not directly connected to the base node is the level of its respective switch node plus one.

Figure 5:
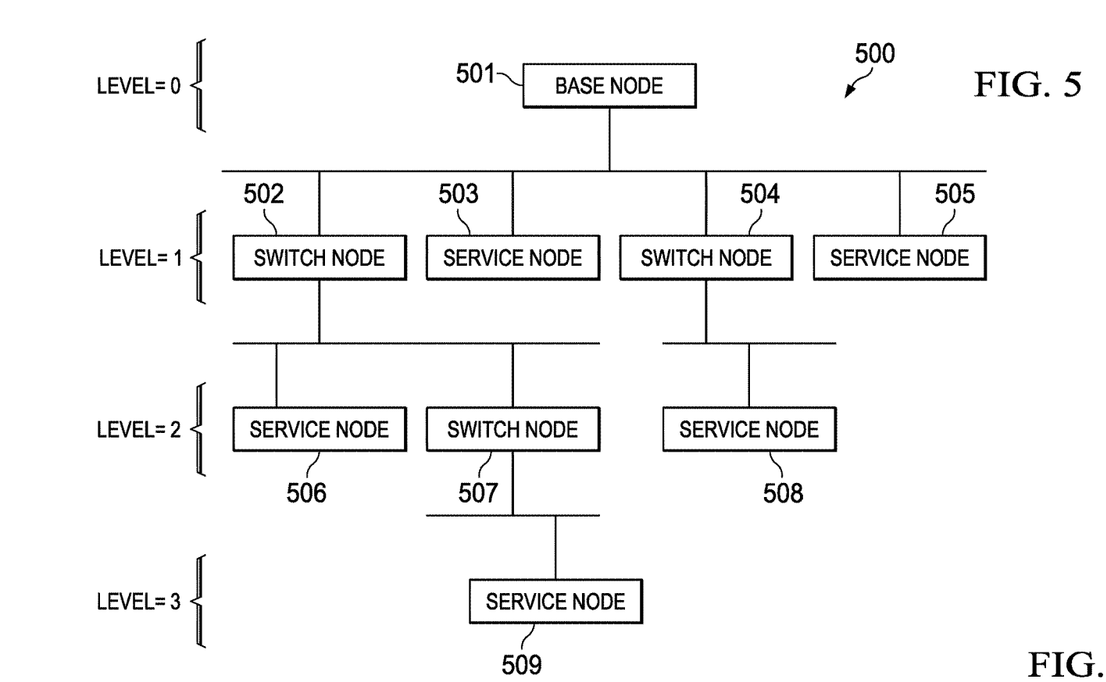
FIG. 5 illustrates a subnetwork according to an example embodiment.

FIG. 5 illustrates a subnetwork 500 according to an example embodiment. Base node 501 is connected to nodes 502-505, which are on level 1 in the subnetwork. Nodes 502 and 504 have been promoted to switch node, and nodes 503 and 505 operate as service nodes. Nodes 506 and 507 are on level 2 of the subnetwork and connect through switch node 502. Node 508 is also on level 2 and is connected through switch node 504. Node 507 has been promoted to switch node and provides a connection to service node 509, which is on level 3 of the subnetwork.

Multicast and broadcast addresses are used for transmitting data information within subnetwork 500. There are several broadcast and multicast address types, depending on the context associated with the traffic flow. A broadcast identifier is used as a destination address for packets that should reach every node of the subnetwork. A multicast identifier is used as a destination address for multicast groups. A unicast address refers to a particular node within the subnetwork with an identifier that match the address fields in the unicast address.

A MAC frame defines a time for channel usage. A frame is comprised of one or more beacons, a shared contention period (SCP), and zero or one contention free period (CFP). The transmission of a beacon by the base node acts as delimiter for the MAC frames.

Figure 6:
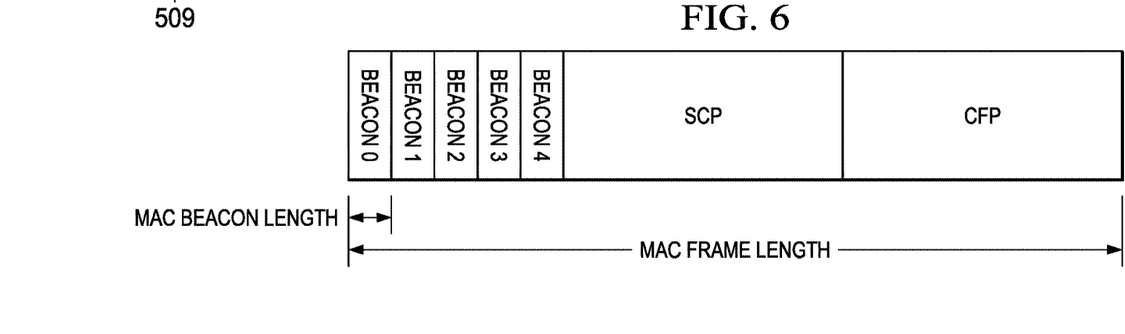
FIG. 6 illustrates the structure of a MAC frame according to one embodiment.

FIG. 6 illustrates the structure of a MAC frame according to one embodiment. A beacon is always MACBeaconLength symbols long, and the frame is MACFrameLength symbols long. A superframe comprises thirty-two consecutive frames.

A service node starts in a disconnected state. The only function performed in the disconnected state is reception of any beacons on the channel. Each service node may maintain a switch table that is updated with the reception of a beacon from any new switch node. A service node may select any switch node from the switch table and proceed with the registration process with that switch node.

Base nodes are primarily responsible for setting up and maintaining the subnetwork. The base node and all the switch nodes on the subnetwork broadcast beacons at fixed intervals of time. The base node always transmits exactly one beacon per frame. Switch nodes transmit beacons with a frequency prescribed by the base node.

The time in which a BPDU is transmitted is referred to as a beacon-slot. All beacon-slots are located at the beginning of a frame, as shown in FIG. 6. A beacon protocol data unit (BPDU) is transmitted in every frame by the base node. The base node BPDU is transmitted at a regular intervals equivalent to MACFrameLength-MACBeaconLength. The switch nodes also transmit BPDUs to maintain their connections within the subnet. The switch nodes also transmit BPDUs at regular times. The switch node is not required to transmit its BPDU in every frame. However, the switch node must transmit at least once within a superframe.

The first beacon-slot in every frame is reserved for the base node. The number of beacon-slots in a frame may change from one frame to another and is indicated by the base node in its BPDU. The switch nodes are allocated a beacon-slot at the time of their promotion from service node. With the registration of each new switch node on the subnet, the base node may change the beacon-slot and/or transmission frequency of already registered switch nodes.

During the reorganization of beacon-slots, if there is a change in the beacon-slot count per frame, the base node should transmit a frame control packet to the entire subnetwork. The frame control packet is an indication of change in the overall frame structure, such as changes in the number of beacon, SCP, or CFP slots. Switch nodes that receive a frame control packet relay it to all connected nodes. This is required for the entire subnetwork to have a common understanding of frame structure, especially in regions where a controlling switch node transmits BPDUs at frequencies less frequently than once per frame.

The beacon slot allocation policy ensure that during promotion a service node is never assigned to transmit a beacon in a slot consecutive to beacons from the node to which it is registered. For example, switch nodes in level 1, which are directly connected to the base node, do not transmit beacons in slot 1 because it is directly adjacent to the base node's beacons in slot 0.

When changing the frame structure, to add or remove beacon slots, or to change which beacon slot that a switch node should use, it is necessary to indicate when such a change should occur. All nodes must change at the same time otherwise there may be collisions with the beacons transmitted by different nodes. A beacon superframe comprises thirty-two frames. Each beacon contains a five-bit sequence number. Any messages that contain changes to the structure or usage of the frame include a sequence number identifying when the change should occur. The changes requested should only happen when the beacon sequence number matches the sequence number in the change request.

A beacon slot allocation algorithm may be used to assign beacon slots to switch nodes in the subnetwork. In one embodiment, the number of beacon slots is set to five (assigned as slots 0, 1, 2, 3, and 4). It will be understood that a different numbers of beacon slots may be used in other embodiments.

The first slot (slot 0) is used only for base node beacons, which are transmitted in every frame. The switch nodes are not assigned to the first slot to ensure that there is no interference with the base node beacons. The switch nodes receive the base node beacons in each frame. The switch nodes should not be assigned slot 1 to provide time for the switch nodes to transition from receiver (of the base node beacon in slot 0) to transmitter (of their own beacon) in the assigned slot. Similarly, the switch nodes should not be assigned a beacon slot that is adjacent to the slot used by a parent or child switch node to allow time for each switch node to transition between transmitter and receiver states.

Referring to FIG. 5, for example, if base node 501 transmits in slot 0, then switch node 502 may transmit its beacon in slots 2, 3, or 4, but not slot 1. However, switch node 507 also must not transmit its beacon in a slot adjacent to the beacon slot assigned to switch node 502. So, if switch node 502 transmits in slot 2, then switch node 507 can only transmit in beacon slot 4 in the same frame.

In an example beacon assignment algorithm, all switch nodes use a frequency of four for beacon transmissions, which means that the switch nodes each transmit a beacon once every sixteen frames. This ensures at least two beacons per switch node per superframe. The switch nodes are assigned non-overlapping slots and/or patterns as much as possible.

For up to thirty-two switch nodes, the nodes are guaranteed to have a non-overlapping slot or pattern by choosing slots 2 and 4. Sixteen switch nodes can be accommodated by using each slot with a frequency of four. Since each switch node will be assigned a different slot or pattern, it is guaranteed that the first thirty-two switches will have no overlapping pattern at any point of time.

Figure 7:
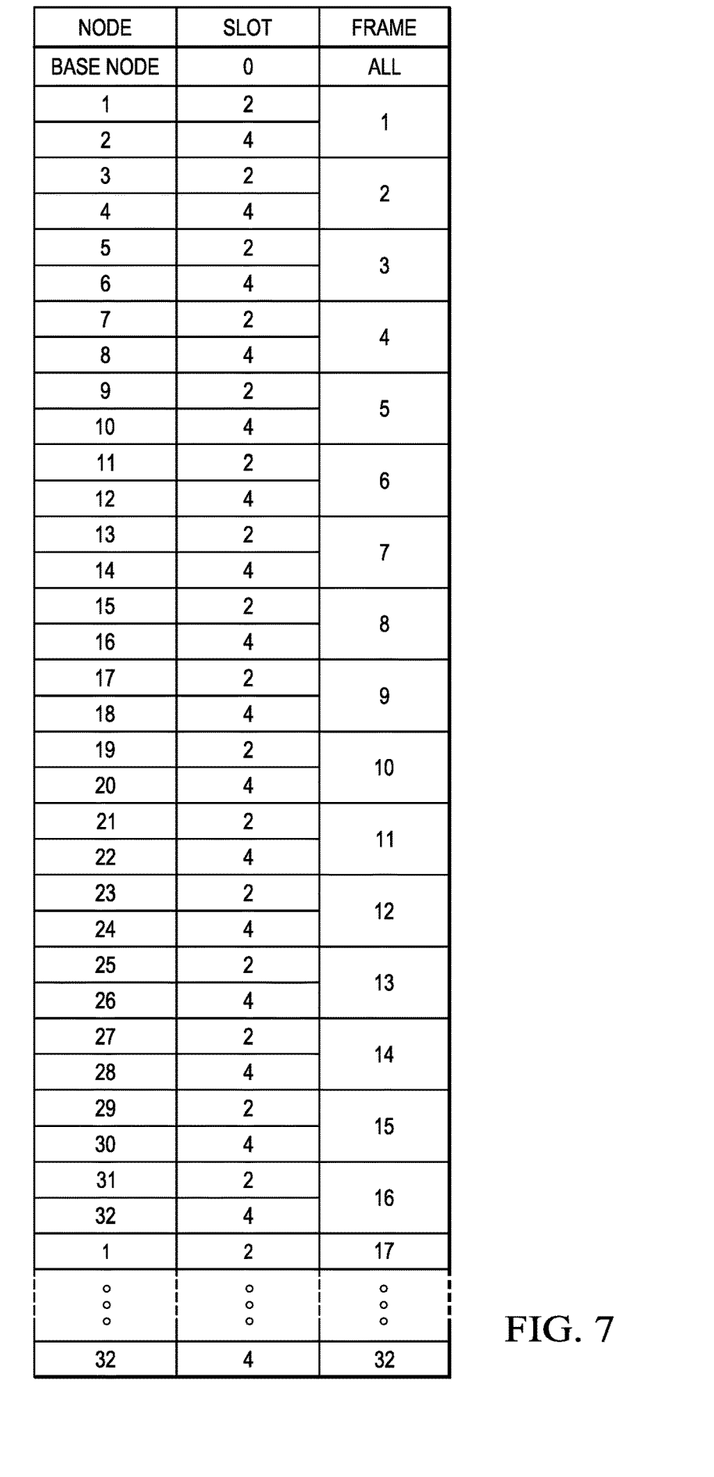
FIG. 7 illustrates an example distribution of thirty-two switch nodes using slots 2 and 4.

FIG. 7 illustrates an example distribution of thirty-two switch nodes using slots 2 and 4. The base node transmits in slot 0 in all frames. The switch nodes are assigned sequentially to slots 2 and 4 without regard to the level of each switch node. As illustrated, it takes sixteen frames for each switch node to transmit one beacon in this manner. By repeating the pattern again, each switch node may transmit two beacons during a thirty-two-frame superframe.

If the subnetwork has more than thirty-two switch nodes, then the algorithm must be modified. The algorithm determines the slot, frequency, and sequence of the beacon-slot assignment as follows:

Any switch node belonging to level 1 is assigned slot 3 with a frequency of four. This avoids border interference with the base node beacon in slot 0 and allows for turnaround processing.

Any switch node belonging to level 2 or above can be assigned to slot 1 (if available) or slot 3. Slot 1 is available to the switch nodes on level 2 or higher because they are not directly connected to the base node on level 0. Instead, the switch nodes on levels 2 or higher receive a beacon in slot 3 from a switch node on level 1.

The parent-child switch node relationship is preserved by ensuring that a child switch node transmits either in a different slot (while maintaining a one-gap slot separation if using the same pattern) and/or in a different pattern than its parent switch node.

This will allow for accommodating up to sixty-four switch nodes with care to avoid interference between parent-child switch nodes as much as possible.

For subnetworks with more than sixty-four switch nodes, the available slots may be reused. For example, the algorithm may adopt an n-level—such as a 2-level—separation rule. When a new switch node is added to the subnetwork, the beacon allocation algorithm ensures that it re-uses the first available slot that is used by a switch node that is n-levels away—either n-levels above as a grandparent or n-levels below as a grandchild—of the new switch node. This allows for new switch nodes to cause minimal interference to the already existing switch node.

The parent-child relationship is preserved in these larger than sixty-four switch node systems by ensuring that the switch nodes transmit in different slots (separated by one slot if using the same pattern) and/or in a different pattern.

Figure 8:
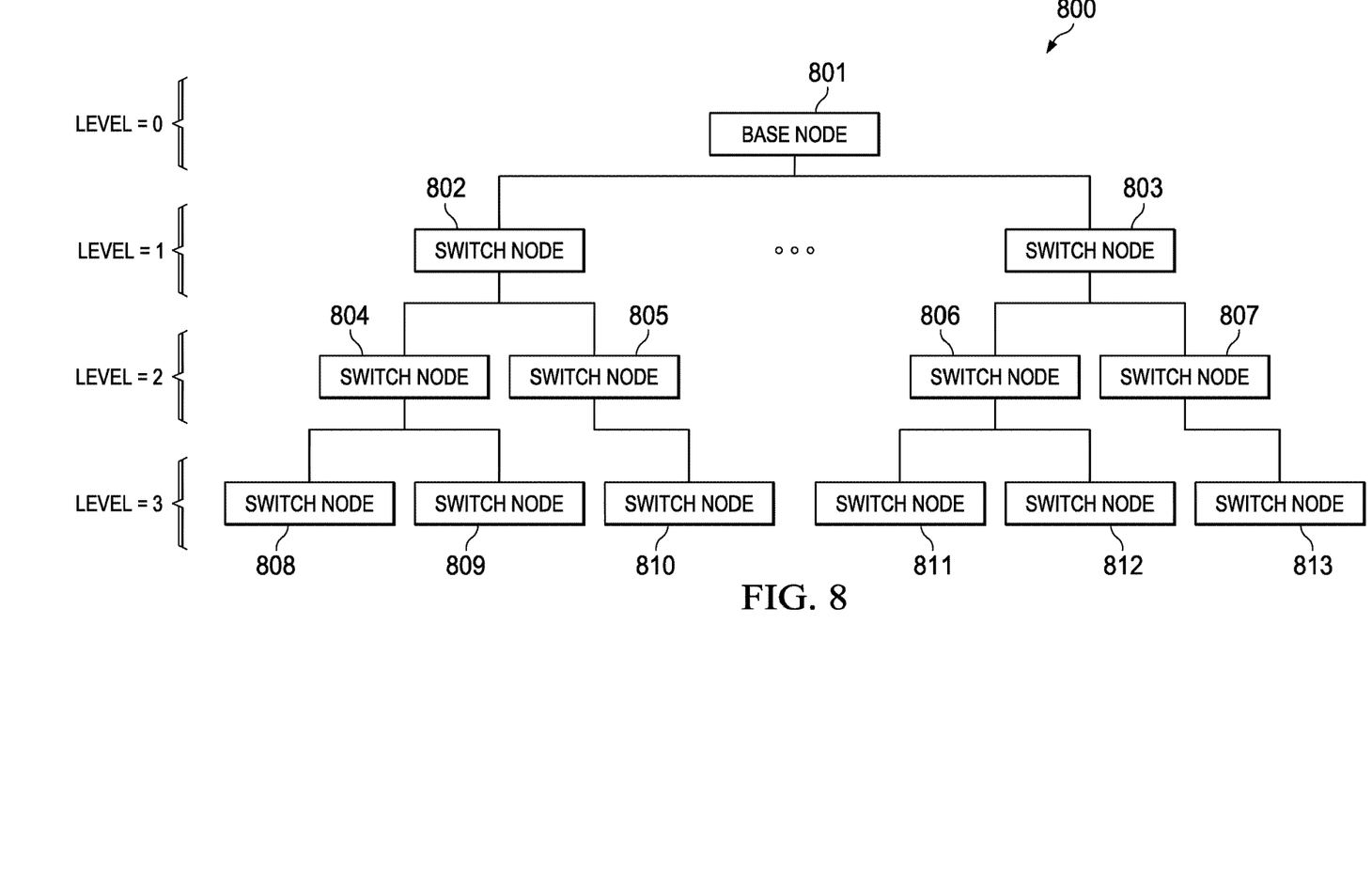
FIG. 8 illustrates a portion of a subnetwork having more than thirty-two switch nodes spread across multiple levels.

FIG. 8 illustrates a portion of a subnetwork 800 having more than thirty-two switch nodes, including base node 801 and service nodes 802-813 spread across three levels. Each switch node 802-813 may support multiple service nodes (not shown).

Figure 9:
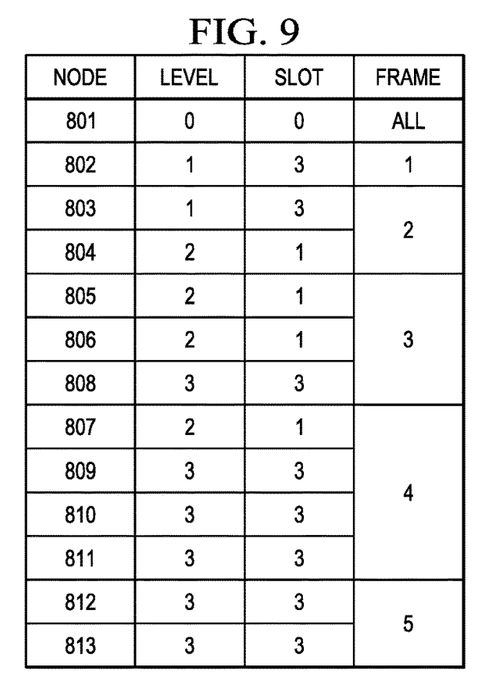
FIG. 9 is a table illustrating how switch nodes on multiple levels can be distributed to support more than thirty-two switch nodes.

FIG. 9 is a table illustrating how switch nodes on multiple levels, such as the switch nodes in FIG. 8, can be distributed to support more than thirty-two switch nodes. This example assignment allows switch nodes on the same level to maintain separation from their parent node. However, switch nodes on the same level may transmit at the same time on the same slot if they have different parent nodes. For example, nodes 809, 810, and 811 may use the same slot and frame assignment because their beacons will not be received by the same parent node.

Figure 10:
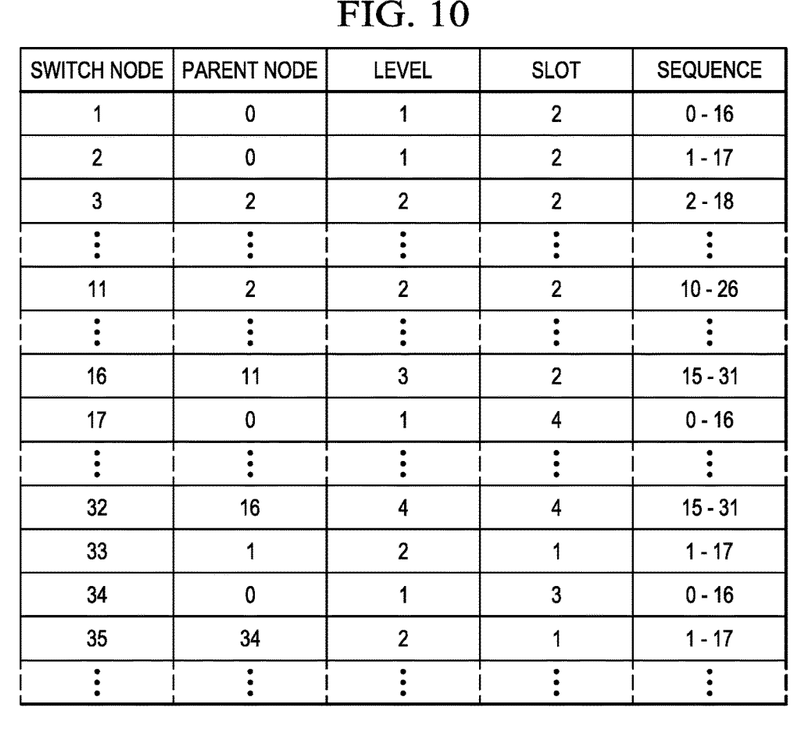
FIG. 10 illustrates another example of a beacon slot allocation policy according to another embodiment using slot, time, and special separation.

FIG. 10 illustrates another example of a beacon slot allocation policy according to another embodiment using slot, time, and special separation. Slot separation allows two switch nodes to use different slots within the same frame. Time separation allows two switch nodes to use the same or adjacent slots, but in different frames. Spatial separation allows two switch nodes to use the same or adjacent slots in the same frame if the nodes are separated by a certain number of levels.

Switch nodes 1 and 34 use slot separation to deconflict their beacon transmissions. Both nodes use the same sequence or pattern of beacon transmission in frames zero and sixteen, but switch node 1 transmits in slot 2 and switch node 34 transmits in slot 3. Both of these slots maintain at least one empty slot from the base node. However, switch nodes 1 and 34 transmit beacons to different groups of child nodes, so the one-slot separation is not required for their transmissions.

Switch nodes 3 and 11 use time separation to deconflict their beacon transmissions. Both nodes are child nodes of switch node 2 and both nodes are transmitting their beacon in slot 2. However, nodes 3 and 11 are using different patterns for when they transmit. Node 3 transmits beacons in slots 2 and 18, while node 11 transmits beacons in slots 10 and 26.

Switch nodes 33 and 35 use spatial separation to deconflict their beacon transmissions. Nodes 33 and 35 are on level 2, but have different parent nodes on level 1. Even if nodes 33 and 35 use the same slot and frame sequence pattern to transmit beacons, the beacons will not conflict because the nodes are separate by at least two other nodes.

It will be understood that various operations illustrated in FIGS. 6 and/or 7 may be executed simultaneously and/or sequentially. It will be further understood that each operation may be performed in any order and may be performed once or repetitiously. In various embodiments, the blocks shown in FIGS. 6 and/or 7 may represent sets of software routines, logic functions, and/or data structures that are configured to perform specified operations. Although these modules are shown as distinct logical blocks, in other embodiments at least some of the operations performed by these modules may be combined in to fewer blocks. Conversely, any given one of the modules shown in FIGS. 6 and/or 7 may be implemented such that its operations are divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method, comprising:
performing, by a communications device:
assigning beacon transmission times to a plurality of nodes within the a network to which the communication device is connected, the assigned beacon transmission times comprising a beacon slot and frame pattern, wherein the beacon slot and frame pattern includes a plurality of beacon slots distributed among a plurality of frames, and wherein the beacon slot and frame pattern includes a single unassigned beacon slot between every two assigned beacon slots, the two assigned beacon slots being assigned to two different respective nodes so that each node of the plurality of nodes does not transmit a beacon in a beacon slot that is adjacent to a beacon slot assigned to another node that is a parent or a child to the node.

2. The method of claim 1, wherein each frame includes one base node beacon slot that is reserved for a base node of the plurality of nodes.

3. The method of claim 1, further comprising:
assigning every other beacon slot in each frame to a different node until each node has an assigned beacon transmission time corresponding to the beacon slot assigned to the node.

4. The method of claim 1, wherein the plurality of beacon slots are distributed among the plurality of frames so that each frame has five beacon slots including a base node beacon slot that is reserved for a base node, a first switch node beacon slot, a second switch node beacon slot, a third switch node beacon slot, and a fourth switch node beacon slot.

5. The method of claim 4, further comprising:
assigning the second switch node beacon slot and the fourth switch node beacon slot in each frame to a different node until each node has an assigned beacon transmission time corresponding to the beacon slot assigned to the node; and reserving the first switch node beacon slot and the third switch node beacon slot in each frame as an unassigned beacon slot.

6. The method of claim 4, wherein the plurality of frames are organized into one or more superframes, each superframe including thirty-two frames.

7. The method of claim 6, wherein the plurality of nodes includes thirty-two nodes, and wherein, in accordance with the beacon slot and frame pattern, each node transmits a beacon once every sixteen frames.

8. The method of claim 1, wherein the beacon slot and frame pattern of an assigned beacon transmission time has also been assigned to another node that is at least n-levels away, wherein n-levels comprises at least two-levels.

9. The method of claim 1, further comprising:
assigning a beacon slot number and a first sequence number to a parent node on a first level;
assigning the beacon slot number and a second sequence number to a child node on a next level below the parent node, wherein the parent node and the child node transmit in a same beacon slot position, but the second sequence number causes the child node to transmit in a different frame pattern than the parent node.

10. The method of claim 1, wherein the beacon slot and frame pattern assigned to a first node has also been assigned to a second node that is on the same level below the base node as the first node, and wherein the first node and the second node do not share a same parent node.

11. A communications device comprising:
a processor; and
a memory coupled to the processor, the memory configured to store program instructions executable by the processor to cause the communications device to:
assign a beacon slot and frame pattern for beacon transmission times to a plurality of nodes within the a network to which the communication device is connected, wherein the beacon slot and frame pattern includes a plurality of beacon slots distributed among a plurality of frames, and wherein the beacon slot and frame pattern includes a single unassigned beacon slot between every two assigned beacon slots, the two assigned beacon slots being assigned to two different respective nodes so that each node of the plurality of nodes does not transmit a beacon in a beacon slot that is adjacent to a beacon slot assigned to another node that is a parent or a child to the node.

12. The communication device of claim 11, the program instructions executable further causing the communications device to:
assign every other beacon slot in each frame to a different node until each node has an assigned beacon transmission time corresponding to the beacon slot assigned to the node.

13. The communication device of claim 11, wherein the plurality of beacon slots are distributed among the plurality of frames so that each frame has five beacon slots including a base node beacon slot that is reserved for a base node, a first switch node beacon slot, a second switch node beacon slot, a third switch node beacon slot, and a fourth switch node beacon slot.

14. The communication device of claim 13, wherein the plurality of frames are organized into one or more superframes, each superframe including thirty-two frames.

15. The communication device of claim 14, wherein the plurality of nodes includes thirty-two nodes, and wherein, in accordance with the beacon slot and frame pattern, each node transmits a beacon once every sixteen frames.

16. The communication device of claim 13, the program instructions executable further causing the communications device to:
assign the second switch node beacon slot and the fourth switch node beacon slot in each frame to a different node until each node has an assigned beacon transmission time corresponding to the beacon slot assigned to the node; and
reserve the first switch node beacon slot and the third switch node beacon slot in each frame as an unassigned beacon slot.

17. The communication device of claim 11, wherein the beacon slot and frame pattern of an assigned beacon transmission time has also been assigned to another node that is at least two-levels away.

18. The communication device of claim 11, wherein the beacon slot and frame pattern assigned to a first node has also been assigned to a second node that is on the same level below the base node as the first node, and wherein the first node and the second node do not share a same parent node.

19. The communication device of claim 11, the program instructions executable further causing the communications device to:
assign a beacon slot number and a first sequence number to a parent node on a first level;
assign the beacon slot number and a second sequence number to a child node on a next level below the parent node, wherein the parent node and the child node transmit in a same beacon slot position, but the second sequence number causes the child node to transmit in a different frame pattern than the parent node.

* * * * *